2,941,911

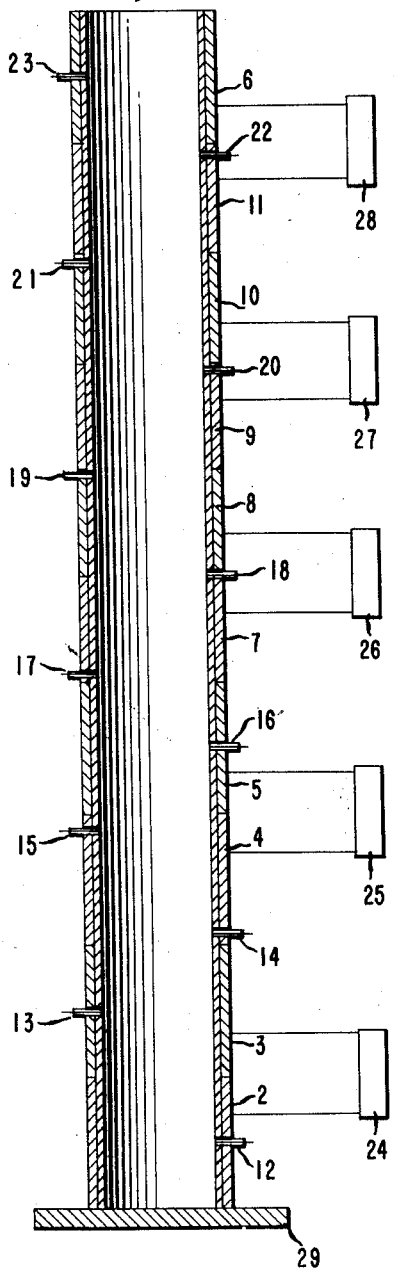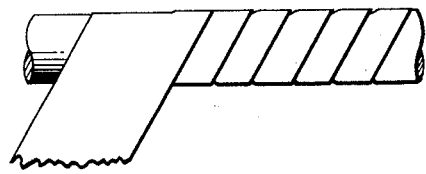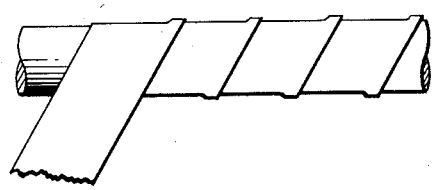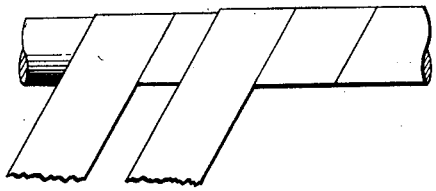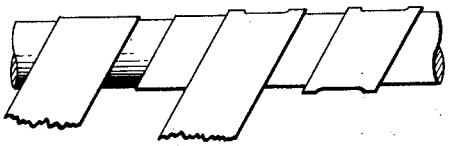
INVENTORS
MILES CHARLES KUMNICK
JOHN FRANK LONTZ
BY Dennis L. Ryan, Jr.
AGENT United States Patent Office 2,941,911
Patented June 21, 1960

METHOD OF FORMING CONTINUOUS STRUCTURES OF POLYTETRAFLUOROETHYLENE

Miles Charles Kumnick and John Frank Lontz, Wilmington, Del., assignors to E. I. du Pont de Nemours and Company, Wilmington, Del., a corporation of Delaware Filed Nov. 15, 1955, Ser. No. 546,875

6 Claims. (Cl. 154—2.26)

This invention relates to a method of forming continuous structures of polytetrafluoroethylene, and more particularly to a method of heat-sealing overlapping coils of polytetrafluoroethylene tape to themselves to form a continuous sheath of polytetrafluoroethylene.

Methods of preparing polytetrafluoroethylene tape are disclosed in a number of U.S. patents, as for example Brubaker 2,400,099, Alfthan 2,406,127, Sanders 2,530,173, Berry 2,559,750, Edgar 2,578,572 and Llewellyn at al. 2,685,707.

Methods of forming a continuous sheath which involve lapping a core with polytetrafluoroethylene tape are also disclosed in a number of U.S. patents, as for example Bondon 2,454,625, Keyes 2,459,653, Pendleton 2,533,501, Sanders 2,606,134 and Young 2,691,694.

The prior art methods for forming continuous sheaths with polytetrafluoroethylene tape have, however, involved the use of some extraneous material, either as a sealant to fill the crevices between the overlapping tape coils, or as a binder to hold the overlapping coils in intimately contiguous relationship. While such use of sealants or binders improves the integrity of the sheath, it also entails added inconvenience or expense, or entails some scrifice in one or more of the highly desirable characteristics of the resin itself, since the extraneous material becomes an integral part of the sheath.

It is an object of the present invention to provide a new method of forming continuous structures of polytetrafluoroethylene. A further object is to provide a new method of forming a continuous structure with polytetrafluoroethylene tape. Yet another object is to provide a method of forming a continuous sheath with polytetrafluoroethylene tape without incorporating extraneous material in the sheath as a sealant or binder. Another object is to provide a novel way of heat-sealing polytetrafluoroethylene tape to itself. Other objects will be apparent hereinafter.

According to the present invention it has been found that the aforesaid objects may be achieved by a process which comprises snugly lapping an elongated heat-resistant core of generally circular cross-section with cold-drawn polytetrafluoroethylene tape, and gradually heating the lapping above 327° C. in a convective heating medium, wherein the temperature to which the lapping is exposed is gradually increased through the 300 to 327° C. range at a rate not exceeding about 1.5° C. per second.

In the drawings, Figures 1 through 4 are side elevations showing several methods of winding tape about a core to accomplish the lapping operation, and Figure 5 is an elevation view of a vertical oven, suitable for carrying out the gradual heating step in accordance with the process of the present invention.

The polytetrafluoroethylene tape used as a starting material is preferably from 2 to 10 mils thick, having a dielectric strength of at least about 500 volts per mil, such as that prepared by the process of the aforementioned Alfthan patent. Thicker tape can be used but is more difficult to lap snugly. Tapes of lower quality may also be used, but are more likely to develop flaws during the heating step.

It is essential that the polytetrafluoroethylene tape be cold-drawn in order that sufficient pressure be developed during the subsequent heating to cause heat-sealing. Cold-drawing is accomplished by uniformly stretching the tape in the lengthwise direction at some temperature below about 300° C. until it acquires the capacity to shrink appreciably on being heated to 300° C. A convenient measure of the extent of cold-drawing is the shrinkage resulting from heating a sample of the cold-drawn tape, unrestrained, at 300° C. for one hour and then cooling to room temperaure, expressed as percentage of original length in the drawn state. Preferably, the shrinkage as measured by this test is in the range of 5 to 30 percent. Satisfactory uniformity and extent of cold-drawing is readily achieved as an incident of the lapping operation by winding the tape about the core under controlled tension, sufficient to cause an elongation of 10 to 50 percent of undrawn length. Alternatively, cold-drawing may be accomplished prior to the lapping operation by passing the tape through successive pairs of pinch rolls operating at successively higher speeds, or in other ways known to the art.

As indicated in the drawings, there may be used any of a variety of lapping patterns which afford a continuous structure by heat-sealing of the overlapping coils. The patterns indicated in Figures 1 through 4 are suitable for use with the thinner tapes of 2 to 5 mils thickness, but patterns 3 and 4 are more appropriate for the less flexible tapes thicker than 5 mils, which are more difficult to lap snugly. When using the pattern of Figure 1, each succeeding coil is ordinarily overlapped from one-half to three-fourths of the preceding coil. Preferably, not more than four thicknesses of tape will be applied and fused at one time. Where greater thickness is desired, best results are obtained by using several lapping and heating cycles.

The core itself may be of any material which is sufficiently heat-resistant to remain firm at temperatures above 327° C. and has a shape which is elongated and of generally circular cross-section so as to provide a foundation about which the tape may be snugly lapped so as to shrink and encounter positive resistance during the heating step. Thus the core may be of metal, stone, ceramic, glass, wood, heat-resistant plastic, or the like, and may be in the form of a hollow or solid cylinder or frustoconical section. Slight irregularities in the shape of the cross-section may be tolerated, as for example where the core consists of a bundle of cylindrical wires. The cross-section may also be somewhat elliptical. It is within the scope of the invention to employ as a core a mandrel which can be collapsed and removed after the heating step in order to obtain a continuous tube of polytetrafluoroethylene.

The gradual heating of the lapping to a temperature above 327° C. in a convective heating medium wherein the temperature to which the lapping is exposed is gradually increased through the 300 to 327° C. range at a rate not exceeding 1.5° C. per second is also essential to the production of continuous structures in the process of the present invention. If the rate of increase is substantially higher than this, as is ordinarily the case in conventional sintering operations, the tape wrinkles and buckles so that a continuous seal is not obtained. Preferably, the rate of increase in this range does not exceed 1° C. per second with lappings of up to 10 mils applied thickness, and is halved for each additional 10 mils of applied thickness. The 300 to 327° C. range is particularly sensitive, since it is in this range that most of the expansion and contraction of the tape takes place.

Materially higher rates can be used on either side of this range. Preferably, however, the entire heating cycle will be fairly gradual. In order to achieve adequate sealing in minimum time, it is desirable that peak temperature to which the lapping is exposed be considerably above 327° C., preferably in the range of 370 to 400° C. The rate of cooling from peak temperature is not critical, but slightly better results are obtained if the cooling is also brought about at a fairly gradual rate. In a particularly preferred heating and cooling cycle, a continuous plot of the temperature of the convective heating medium vs. cumulative exposure time is roughly parabolic.

Gradual heating may be accomplished batchwise by placing the lapped assembly in a relatively cold oven and gradually increasing the temperature. For reasons of economy, however, it is preferable to carry out the gradual heating in a continuous manner by passing the lapped assembly at a steady rate through an oven such as that of Figure 5, so that the lapping successively traverses a plurality of separately controlled heating zones.

The invention is more specifically described and explained in the following examples, which, however, are not intended as limitations.

Example I

Undrawn polytetrafluoroethylene tape 2 mils thick and ⅝ inch wide, obtained by the process of the aforementioned Alfthan patent, is used as a starting material. A sample of the undrawn tape has zero shrinkage as measured by the 300° C. shrinkage test previously described. Four 36" long specimens of the tape are snugly lapped about four ⅝" diameter stainless steel rods at four different controlled tensions. The lapping is carried out in the pattern shown in Figure 1, with each succeeding coil overlapping two-thirds of the preceding coil so as to apply a triple thickness. By unwinding similar tapes lapped about similar rods at the same tensions, it is found that the samples were elongated 0, 10, 20, and 50 percent of their undrawn length by these treatments.

Each of the lapped rods is pulled upwardly through an elongated vertical oven, such as that shown in Figure 5, at the rate of 12 inches per minute. The oven body is of aluminum pipe 2 inches in internal diameter, having a wall thickness of ½ inch and a length of 115 inches. The pipe is heated with ten 220 volt 900 watt band heaters, five of which (2 to 6) are 14 inches long and five of which (7 to 11) are 9 inches long. Surrounding the pipe and the band heaters are insulating layers of asbestos, aluminum foil, and fiber glass (not shown). Twelve thermocouples (12 to 23) penetrating the pipe wall, are spaced along the length of the oven at distances of 7, 20, 30, 39, 48, 57, 65, 73, 81, 89, 98, and 107 inches, respectively, from the lower end. Each adjacent pair of band heaters is controlled by a separate powerstat (24 to 28). The lower end of the pipe is fitted with a brass plate (29) having a central aperture large enough to admit the lapped assembly, and smaller peripheral apertures (not shown) through which air is forced into the oven interior at about ⅓ cubic foot per minute. The powerstats are adjusted so that the temperatures in ° C. at the several thermocouple locations, reading from the lowermost upward, are as follows: 215, 280, 325, 335, 350, 380, 380, 385, 390, 390, 360, and 330, respectively.

On exit from the top of the oven, the polytetrafluoroethylene in each case is seen to be in the translucent state characteristic of a temperature above 327° C. The hot assemblies are allowed to cool in air to room temperature. It is found that each of the cold-drawn samples of tape has shrunk tightly about the core to form a smooth continuous sheath, while the undrawn sample is found to hang loosely in unsealed coils about the core. With some difficulty, it was found possible to slip the heat-sealed sheaths off their cores so as to obtain integral tubes.

In the above experiments a plot of temperature vs. time over the 300 to 327° C. range indicated a rate of increase of about 0.5° C. per second.

Example II

Undrawn polytetrafluoroethylene tape similar to that of Example I but 3 mils thick and ⅜" wide is lapped about a taut continuous length of Type AWG 18 seven-strand wire in the pattern described in Example I under a controlled tension sufficient to elongate the tape about 20 percent of its undrawn length as determined by unwrapping a similarly applied sample. The unwrapped sample is observed to shrink about 10 percent of its drawn length in the 300° C. shrinkage test previously described.

The initial short time dielectric strength of the lapping as determined via ASTM D-149-44 in an aqueous solution of sodium chloride is 1.8 kilovolts.

A portion of the lapped wire is passed upwardly through the vertical oven of Example I at the rate of 30 inches per minute. Temperatures at the several thermocouple locations in ° C., reading from the lowermost upward, are as follows: 220, 272, 315, 335, 356, 382, 385, 389, 389, 390, 390 and 358° C., respectively. A plot of temperature vs. time over the 300 to 327° C range indicates a rate of increase of about 1° C. per second. On issuance from the oven, the polytetrafluoroethylene is observed to be in the translucent state characteristic of a temperature above 327° C. The heated assembly is cooled to room temperature and the short time dielectric strength of the sheath, determined as described above, is observed to be 4.0 kilovolts.

In comparison, another sample of the lapped wire is passed upwardly through an infrared oven, 6 inches long, at a steady rate such that the total time of exposure to heating is two minutes. On issuance from the oven, the polytetrafluoroethylene is again observed to be in the translucent state characteristic of a temperature above 327° C. and is then allowed to cool to room temperature. However, the rate of temperature increase through the 300 to 327 range in this instance is over 2.5° C. per second as measured by a thermocouple embedded in the surface of the lapping during its travel through the oven. On cooling, the lapping is observed to be wrinkled. Its short time dielectric strength, determined in the manner described above, is unchanged at 1.8 kilovolts.

The process of the present invention may advantageously be used in the preparation of continuous structures such as electrical insulation, sheaths, tubes, pipes and the like from polytetrafluoroethylene tape. Various modifications and adaptations of the process will be apparent to those skilled in the art.

We claim:

1. The process which comprises immersing in a convective heating medium at a temperature below 300° C. an assembly consisting essentially of an elongated heat-resistant core of generally circular cross-section and a continuous non-integral sheath of cold-drawn, completely fused polytetrafluoroethylene tape snugly lapped upon said core; increasing the temperature of said medium to 300° C., thence through the 300 to 327° C. range at a rate not exceeding 1.5° C. per second, to a temperature above 327° C., while maintaining said assembly immersed therein; and further heating said assembly at a temperature above 327° C. until said sheath is converted to integral form.

2. Process of claim 1 wherein said rate is about 1° C. per second.

3. Process of claim 1 wherein said core is electrically conductive wire.

4. Process of claim 1 wherein said core is a collapsible mandrel.

5. The process which comprises snugly lapping a cold-drawn, completely fused polytetrafluoroethylene tape, having the capacity to shrink 5 to 30 percent of its drawn length upon being heated unrestrained at 300° C. for one hour and cooled to room temperature, upon an elongated heat-resistant core of generally circular cross-section to form an assembly consisting essentially of said core and a continuous non-integral sheath of said tape; immersing said assembly in a convective heating medium at a temperature below 300° C., increasing the temperature of said medium to 300° C., thence through the 300 to 327° C. range at a rate not exceeding 1.5° C. per second, to a temperature above 327° C., while maintaining said assembly immersed therein; and further heating said assembly at a temperature above 327° C. until said sheath is converted to integral form.

6. The process which comprises cold-drawing a completely fused polytetrafluoroethylene tape 10 to 50 percent of its undrawn length; snugly lapping the drawn tape upon an elongated heat-resistant core of generally circular cross-section to form an assembly consisting essentially of said core and a continuous non-integral sheath of said tape; immersing said assembly in a convective heating medium at a temperature below 300° C.; increasing the temperature of said medium to 300° C., thence through the 300 to 327° C. range at a rate not exceeding 1.5° C. per second, to a temperature above 327° C., while maintaining said assembly immersed therein; and further heating said assembly at a temperature above 327° C. until said sheath is converted to integral form.

References Cited in the file of this patent
UNITED STATES PATENTS

| | | |
|---|---|---|
| 2,396,629 | Alfthan et al. | Mar. 19, 1946 |
| 2,397,568 | Seaman | Apr. 2, 1946 |
| 2,406,127 | Alfthan | Aug. 20, 1946 |
| 2,412,851 | Wieseman | Dec. 17, 1946 |
| 2,454,625 | Bondon | Nov. 23, 1948 |
| 2,456,621 | Cheney | Dec. 21, 1948 |
| 2,459,653 | Keyes | Jan. 18, 1949 |
| 2,484,484 | Berry | Oct. 11, 1949 |
| 2,578,522 | Edgar | Dec. 11, 1951 |
| 2,581,977 | Spalding et al. | Jan. 8, 1952 |
| 2,700,094 | Hosack | Jan. 18, 1955 |
| 2,711,982 | Straka | June 28, 1955 |

FOREIGN PATENTS

| | | |
|---|---|---|
| 743,497 | Great Britain | Jan. 18, 1956 |